3,454,565
NOVEL INDANONES
Sidney Robert Safir, River Edge, N.J., and Richard Preston Williams, Tomkins Cove, N.Y., assignors to American Cyanamid Company, Stamford, Conn., a corporation of Maine
No Drawing. Filed Oct. 5, 1966, Ser. No. 584,356
Int. Cl. C09b 23/16; C07c 49/00, 87/28
U.S. Cl. 260—240
10 Claims This invention relates to new organic compounds. More particularly, it relates to substituted indanones and method of preparation.

The novel indanones of the present invention may be illustrated by the following formula:

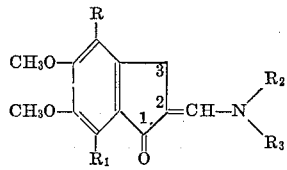

wherein R and $R_1$ are methoxy or hydrogen with the proviso that they are always different, i.e., when R is methoxy, $R_1$ is hydrogen and when R is hydrogen, $R_1$ is methoxy; $R_2$ and $R_3$ are lower alkyl or tetrahydrofurfuryl and

is piperidino, $\Delta^3$-pyrrolino or 4-methylpiperazino.

The compounds of this invention are crystalline solids or occasionally oils which are sparsely soluble in water, but soluble in lower alkanols, acetone and the like. The compounds form crystalline nontoxic acid addition salts which are soluble in water.

The compounds of the present invention show central nervous system depressant activity which makes them useful as medicaments. For example, they may be used as sedatives, hypnotics, tranquilizers and muscle relaxants.

The compounds of this invention may be prepared conveniently by either of the following general methods:

Method A.—This method can be used to prepare the products of this invention in which R is hydrogen and $R_1$ is methoxy. 5,6,7-trimethoxyindanone is reacted with a lower alkyl formate in the presence of a strong base to form 2-(hydroxymethylene)-5,6,7-trimethoxy-1-indanone, which in turn is allowed to react with an appropriate secondary amine to form the desired product. In the first reaction ethyl formate may be used with sodium methoxide as the strong base. The reaction can be carried out in an appropriate solvent-like benzene at a temperature range of 10° C. to 80° C., but preferably at 25° C. to 30° C. Addition of water followed by acidification with dilute aqueous mineral acid allows the 2-(hydroxymethylene)-5,6,7 - trimethoxy-1-indanone to be isolated. The latter may be reacted with a secondary amine like dimethylamine, diethylamine, di-n-propylamine, or the like; or a secondary amine like N-methyl-N-tretrahydrofurfurylamine, 4-methylpiperazine and $\Delta^3$- pyrroline. The reaction with the secondary amine is ordinarily carried out at a temperature ranging from 0° C. to 40° C. in a solvent such as, for example, methanol, ether or benzene or a combination of such solvents. This series of reactions may be illustrated as follows:

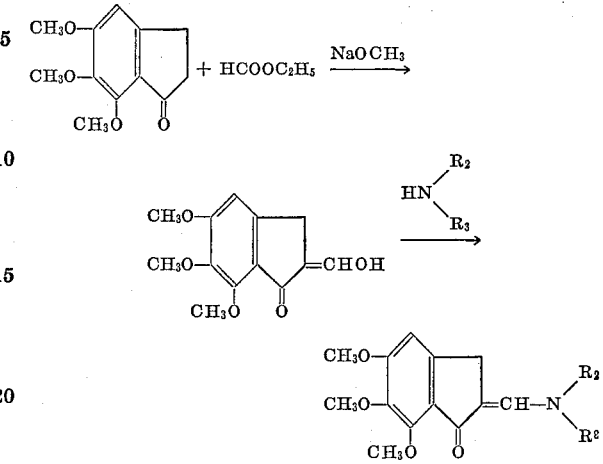

wherein $R_2$, $R_3$ and

are as hereinbefore defined.

Method B.—This method can be used to prepare the products of this invention in which R is a methoxy and $R_1$ is hydrogen. 2,3,4-trimethoxyhydrocinnamic acid is treated with an excess of polyphosphoric acid at temperatures of 25° C. to 100° C. in the absence of a solvent. The clear viscous melt is poured onto ice and water and the mixture is extracted with an immiscible solvent, such as ether, from which by evaporation there is isolated 4,5,6-trimethoxy-1-indanone. The latter is treated, at temperatures of 10° C. to 80° C., with a lower alkyl formate such as, for example, ethyl formate in the presence of a strong base, for example, sodium methoxide, to form after acidification with aqueous mineral acid 2-(hydroxymethylene)-4,5,6-trimethoxy-1-indanone. The latter may then be reacted with an appropriate secondary amine like dimethylamine, diethylamine, di-n-propyl amine, di-n-butylamine, or the like; or a secondary amine, like $\Delta^3$-pyrroline or piperidine at temperatures from 0° to 40° C. in a solvent such as, for example, methanol, ether or benzene or a combination of such solvents to form the desired product. This series of reactions may be illustrated as follows:

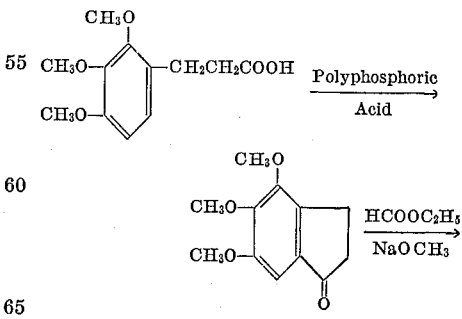

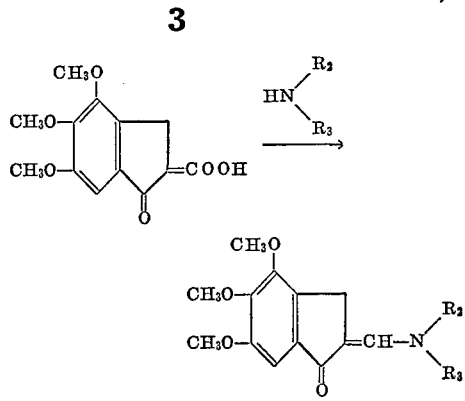

wherein $R_2$, $R_3$ and

are as hereinbefore described.

The following examples illustrate in detail the preparation of representative compounds of the present invention.

Example 1.—Preparation of 2-(hydroxymethylene)-5,6,7-trimethoxy-1-indanone

A solution of 2.2 grams of ethyl formate in 15 milliliters of dry benzene is added to 1.7 grams of sodium methoxide in a nitrogen atmosphere with cooling. After stirring for 5 minutes, a solution of 3.3 grams of 5,6,7-trimethoxy-1-indanone (J. Koo, J. Amer. Chem. Soc. 75, 1891 (1953)) in 200 milliliters of dry benzene is added rapidly. The mixture is stirred for 1½ hours longer, stored at 25° C. for 15 hours under nitrogen and then poured onto ice and water and acidified with dilute sulfuric acid. The resulting solid is filtered and air dried to give 3.2 grams of 2-(hydroxymethylene)-5,6,7-trimethoxy-1-indanone as colorless needles, which, after two recrystallizations from ethanol, shows a melting point of 155 to 156° C.

Example 2.—Preparation of 2-(3-pyrrolin-1-ylmethylene)5,6,7-trimethoxy-1-indanone To a slurry of 2.5 grams of 2-(hydroxymethylene)-5,6,7-trimethoxy-1-indanone in 50 milliliters of a mixture of equal volumes of ether and methanol, there is added a solution of 0.77 gram of $\Delta^3$-pyrroline dissolved in 5 milliliters of ether. After stirring at 25° C. for 1 hour the solvents are evaporated to give 2.6 grams of 2-(3-pyrrolin-1-ylmethylene)-5,6,7-trimethoxy-1-indanone as tan crystals, melting point 137–147° C. Recrystallization from benzene gives pale yellow needles, melting point 144–145° C.

Example 3.—Preparation of 2-dimethylaminomethylene-5,6,7-trimethoxy-1-indanone

The procedure of Example 2 is repeated with the exception that 2-(hydroxymethylene)-5,6,7-trimethoxy-1-indanone is reacted with dimethylamine. The melting point of the crystalline product is 152–153° C.

Example 4.—Preparation of 2-diethylaminomethylene-5,6,7-trimethoxy-1-indanone

The procedure of Example 2 is followed with the exception that 2-(hydroxymethylene)-5,6,7-trimethoxy-1-indanone is reacted with diethylamine. The melting point of the crystalline product is 108–109° C.

Example 5.—Preparation of 2-di-n-propylaminomethylene-5,6,7-trimethoxy-1-indanone The procedure of Example 2 is carried out with the exception that 2-(hydroxymethylene)-5,6,7-trimethoxy-1-indanone is reacted with di-n-propylamine. The melting point of the hydrochloric acid salt of this product is 153–160° C.

Example 6.—Preparation of 2-(4-methylpiperazino)methylene-5,6,7-trimethoxy-1-indanone The procedure of Example 2 is followed with the exception that 2-(hydroxymethylene)-5,6,7-trimethoxy-1-indanone is reacted with 4-methylpiperazine. The melting point of the crystalline product is 145–146° C.

Example 7.—Preparation of 2-[N-methyl-N-tetrahydrofurfurylamino]methylene-5,6,7-trimethoxy-1-indanone The procedure of Example 2 is repeated with the exception that 2-(hydroxymethylene)-5,6,7-trimethoxy-1-indanone is reacted with N-methyl-N-tetrahydrofurfurylamine. The melting point of the hydrochloric acid salt of this product is 135–139° C.

Example 8.—Preparation of 5,6,7-trimethoxy-1-oxo-2-indancarboxaldehyde, 2-(O-methyloxime)

To a slurry of 2.5 grams of 2-(hydroxymethylene)-5,6,7-trimethoxy-1-indanone in 60 milliliters of benzene, there is added 1.0 gram of methoxyamine. After stirring for two days at room temperature the solvent is evaporated and the residual oil evaporatively distilled at 120° C./0.0008 milliliter to give 1.3 grams of 5,6,7-trimethoxy-1-oxo-2-indancarboxaldehyde 2-(O-methyloxime). Recrystallization from isopropyl acetone gives the pure product as colorless needles, melting point 83–84° C.

Example 9.—Preparation of 2-(chloromethylene)-5,6,7-trimethoxy-1-indanone

A slurry of 1.4 grams of 2-(hydroxymethylene)-5,6,7-trimethoxy-1-indanone in 50 milliliters of benzene is refluxed with 1.5 grams of thionyl chloride for 5 hours. After removing the solvent, 1.5 grams of 2-(chloromethylene)-5,6,7-trimethoxy-1-indanone, melting point 83–86° C. is obtained. Recrystallization from cyclohexane gives the pure product, melting point 89–90° C.

Example 10.—Preparation of trimethyl[(5,6,7-trimethoxy-1-oxo-2-indanylidene)-methyl]-ammonium chloride A solution of 900 milligrams of 2-(chloromethylene)-5,6,7-trimethoxy-1-indanone in 15 milliliters of toluene and 3.4 milliliters of 2 N trimethylamine in toluene are allowed to react at room temperature. After 15 hours, the reaction mixture is filtered to remove 1.0 gram of trimethyl[(5,6,7-trimethoxy - 1 - oxo - 2 - indanylidene)-methyl]-ammonium chloride. Recrystallization from ethanol gives the pure product as colorless crystals, melting point 178–179° C. (decomposes).

Example 11.—Preparation of 1-methyl-1[(5,6,7-trimethoxy-1-oxo-2-indanylidene)-methyl]-pyrrolidinium chloride The procedure of Example 10 is followed with the exception that 2 - (chloromethylene)-5,6,7-trimethoxy-1-indanone is reacted with N-methylpyrrolidine. The melting point of the crystalline product is 157–158° C.

Example 12.—Preparation of 4,5,6-trimethoxy-1-indanone

To 390 grams of polyphosphoric acid, preheated to 80° C., there is added 34.5 grams of 2,3,4-trimethoxyhydrocinnamic acid (K. H. Slotta and H. Heller, Ber. 63, 3041 (1930)) in one portion with stirring. The viscous mixture is stirred for 45 minutes at 80° C. and then poured onto 800 grams of cracked ice. The mixture is extracted with ether. The ether layer is washed with aqueous sodium bicarbonate solution and sodium chloride solution, dried over magnesium sulfate and the solvent is evaporated to yield 27 grams of 4,5,6-trimethoxy-1-indanone as brown plates, melting point 67–83° C. Recrystallization from ether gives the pure product as light tan needles, melting point 82–83° C.

Example 13.—Preparation of 2-(hydroxymethylene)-4,5,6-trimethoxy-1-indanone

The procedure in Example 1 is repeated except that 12.9 grams of ethyl formate, 10.0 grams of sodium methoxide, 19.4 grams of 4,5,6-trimethoxy-1-indanone and 1240 milliliters of dry benzene are used. Purification of the product by recrystallization from ether and finally from ether and benzene gives 2-(hydroxymethylene)-4,5,6-trimethoxy-1-indanone as tan needles, melting point 125–126° C.

Example 14.—Preparation of 2-(3-pyrrolin-1-ylmethylene)-4,5,6-trimethoxy-1-indanone To a solution of 1.0 gram of 2-(hydroxymethylene)-4,5,6-trimethoxy-1-indanone in a mixture of 10 milliliters of methanol and 10 milliliters of ether there is added, with stirring at 25° C., a solution of 0.31 gram of Δ³-pyrroline in 10 milliliters of ether. A crystalline precipitate forms. After stirring for 1 hour, the mixture is filtered to yield 1.0 gram of 2-(3-pyrrolin-1-ylmethylene)-4,5,6-trimethoxy-1-indanone as yellow needles, melting point 214–216° C. Recrystallization from ethanol gives pale yellow needles, melting point 215–216° C.

Example 15.—Preparation of 2-dimethylaminomethylene-4,5,6-trimethoxy-1-indanone The procedure of Example 10 is followed with the exception that 2-(hydroxymethylene)-4,5,6-trimethoxy-1-indanone is reacted with dimethylamine. The melting point of the crystalline product is 151–152° C.

Example 16.—Preparation of 2-diethylaminomethylene-4,5,6-trimethoxy-1-indanone The procedure of Example 10 is followed with the exception that 2-(hydroxymethylene)-4,5,6-trimethoxy-1-indanone is reacted with diethylamine. The melting point of the crystalline product is 124–125° C.

Example 17.—Preparation of 2-di-n-propylaminomethylene)-4,5,6-trimethoxy-1-indanone The procedure of Example 10 is followed with the exception that 2-(hydroxymethylene)-4,5,6-trimethoxy-1-indanone is reacted with 2-di-n-propylamine. The melting point of the crystalline product is 104–105° C.

Example 18.—Preparation of 2-di-n-butylaminomethylene-4,5,6-trimethoxy-1-indanone The procedure of Example 10 is repeated with the exception that 2-(hydroxymethylene)-4,5,6-trimethoxy-1-indanone is reacted with di-n-butylamine. The melting point of the hydrochloric acid salt of this product is 121–126° C.

Example 19.—Preparation of 2-piperidinomethylene-4,5,6-trimethoxy-1-indanone The procedure of Example 10 is followed with the exception that 2-(hydroxymethylene)-4,5,6-trimethoxy-1-indanone is reacted with piperidine. The melting point of the crystalline product is 176–177° C.

Example 20.—Preparation of 4,5,6-trimethoxy-1-oxo-2-indancarboxaldehyde, 2-(O-methyloxime)

The procedure of Example 8 is followed with the exception that methoxyamine is reacted with 2-(hydroxymethylene)-4,5,6-trimethoxy-1-indanone. The evaporative distillation point of the oily product is 120° C./0.02 milliliter.

Example 21.—Preparation of 5,6,7-trimethoxy-3-chloro-2-indenecarboxaldehyde

To a solution of 4.1 grams of N,N-dimethylformamide in 25 milliliters of chloroform is added 7.1 g. of phosphorus oxychloride at 5 to 10° C. After stirring for 30 minutes at 25° C., the reaction is chilled to 5 to 10° C. and a solution of 2-(hydroxymethylene)-4,5,6-trimethoxy-1-indanone in 20 milliliters of chloroform is added. After stirring at 25° C. for 2 hours the reaction is poured into ice water. The aqueous layer deposited 1.3 grams of 5,6,7-trimethoxy-3-chloro-2-indenecarboxaldehyde, melting point 109–111° C. on standing. Recrystallization from ethyl ether gives the pure product as tan needles, melting point 109–111° C.

Example 22.—Preparation of 1-{[5,6,7-trimethoxy-3-(3-pyrrolin-1-yl)-2-indenyl]methylene}-3-pyrrolinium chloride A solution of 2 grams of 5,6,7-trimethoxy-3-chloro-2-indenecarboxaldehyde and 1.0 gram of Δ³-pyrroline in 100 milliliters of benzene is allowed to react for fifteen hours at 25° C. The precipitate that formed is removed by filtration to give 1.6 grams of 1-{[5,6,7-trimethoxy-3-(3-pyrrolin-1-yl-2-indenyl]methylene}-3-pyrrolinium chloride, melting point 95–97° C.

Example 23.—Preparation of 5,6,7-trimethoxy-3-(3-pyrrolin-1-yl)-2-indenecarboxaldehyde A solution of 1.6 grams of 1-{[5,6,7-trimethoxy-3-(3-pyrrolin-1-yl)-2-indenyl]methylene}-3-pyrrolinium chloride in 60 milliliters of 2% sodium hydroxide solution is allowed to stand for three hours. The crystalline precipitate that forms is removed by filtration to give 0.7 gram of 5,6,7-trimethoxy-3-(3-pyrrolin-1-yl)-2-indenecarboxaldehyde, melting point 179–180° C. Recrystallization from ethanol gives the pure product melting point 182–183° C.

We claim:
1. A compound selected from the group consisting of those represented by the following formula:

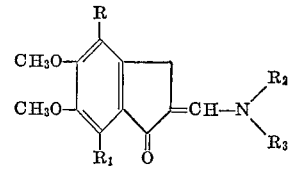

wherein R is selected from the group consisting of hydrogen and methoxy; $R_1$ is selected from the group consisting of hydrogen and methoxy with the proviso that R is not the same as $R_1$; $R_2$ and $R_3$ are selected from the group consisting of lower alkyl and tetrahydrofurfuryl and

is selected from the group consisting of piperidino, Δ³-pyrrolino and 4-methylpiperazino and its non-toxic acid addition salts.

2. The compound according to claim 1; 2-(3-pyrrolin-1-ylmethylene)-5,6,7-trimethoxy-1-indanone.

3. The compound according to claim 1; 2-dimethylaminomethylene-5,6,7-trimethoxy-1-indanone.

4. The compound according to claim 1; 2-diethylaminomethylene-5,6,7-trimethoxy-1-indanone.

5. The compound according to claim 1; 2-di-n-propylaminomethylene-5,6,7-trimethoxy-1-indanone.

6. The compound according to claim 1; 2-(4-methylpiperazino)methylene-5,6,7-trimethoxy-1-indanone.

7. The compound according to claim 1; 2-(3-pyrrolin-1-ylmethylene)-4,5,6-trimethoxy-1-indanone.

8. The compound according to claim 1; 2-dimethylaminomethylene-4,5,6-trimethoxy-1-indanone.

9. The compound according to claim 1; 2-diethylaminomethylene-4,5,6-trimethoxy-1-indanone.

10. The compound according to claim 1; 2-di-n-propyl-aminomethylene-4,5,6-trimethoxy-1-indanone.

References Cited

UNITED STATES PATENTS

| | | | |
|---|---|---|---|
| 2,441,069 | 5/1948 | Hoffmann et al. | 260—293 |
| 2,798,888 | 7/1957 | Ueberwasser | 260—570.8 |
| 3,072,716 | 1/1963 | Huebner | 260—501 |

OTHER REFERENCES

Hoffmann et al.: Helv. Chim. Acta., vol. 27, pp. 1782 to 1783 (1944).

Sam et al.: J. Med. Chem., vol. 7, pp. 366 to 370 (1965).

JOHN D. RANDOLPH, *Primary Examiner.*

U.S. Cl. X.R.

260—570.8, 586, 999